United States Patent [19]
Vanderheiden

[11] Patent Number: 6,049,328
[45] Date of Patent: *Apr. 11, 2000

[54] FLEXIBLE ACCESS SYSTEM FOR TOUCH SCREEN DEVICES

[75] Inventor: Gregg C. Vanderheiden, Madison, Wis.

[73] Assignee: Wisconsin Alumni Research Foundation, Madison, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/608,370

[22] Filed: Feb. 28, 1996

Related U.S. Application Data

[63] Continuation-in-part of application No. 08/546,012, Oct. 20, 1995, abandoned.

[51] Int. Cl.[7] .................................................. G09G 5/00
[52] U.S. Cl. ............................. 345/173; 341/21; 341/27
[58] Field of Search .................................. 345/173, 174, 345/175, 176, 177, 178, 156, 157; 395/358; 341/21, 27; 434/116

[56] References Cited

U.S. PATENT DOCUMENTS 5,589,855  12/1996  Blumstein et al. ...................... 345/173
5,594,471  1/1997  Deeran et al. ........................... 345/173

FOREIGN PATENT DOCUMENTS 9208285  5/1992  WIPO ....................................... 341/27

*Primary Examiner*—Brent A. Swarthout
*Attorney, Agent, or Firm*—Quarles & Brady

[57] ABSTRACT

A touch screen system for people with disabilities provides an access screen presenting multiple paths of communication and multiple methods of input for a variety of disabilities. People with disabilities communicating with this access screen configure the touch screen for their particular communication needs, allowing use of the touch screen efficiently both for individuals with disabilities and for individuals without disabilities. Individuals with occasional difficulty in interpreting written legends on particular virtual buttons may use a distinct access button to provide an augmented legend for those buttons on an "as needed" basis.

8 Claims, 6 Drawing Sheets

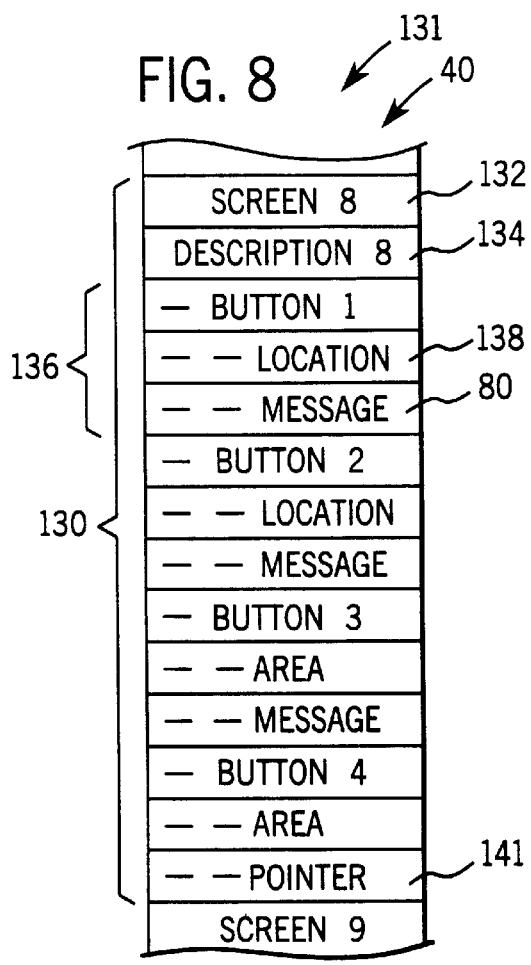
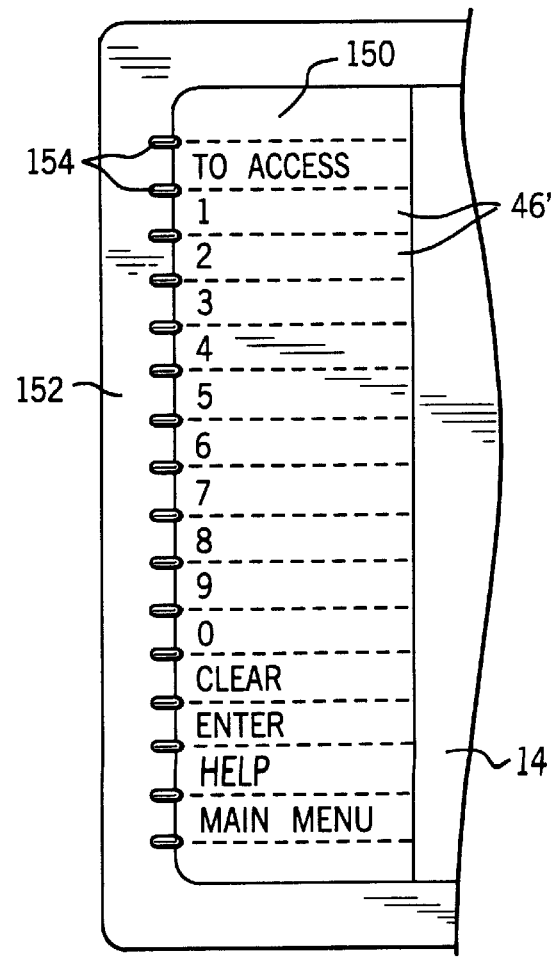

6,049,328

FLEXIBLE ACCESS SYSTEM FOR TOUCH SCREEN DEVICES

This application is a continuation-in-part of U.S. application 08/546,012 filed Oct. 20, 1995.

FIELD OF THE INVENTION

The invention relates generally to computer systems and other devices using touch screens, and in particular, to a touch screen system suitable for use by people with disabilities.

BACKGROUND OF THE INVENTION

An electronic touch screen provides an alternative to a standard typewriter-style electronic keyboard for the entry of data into a computer. With a touch screen system, the user enters data by touching virtual buttons displayed on the computer display. The touch screen eliminates the need for a separate keyboard, and the space required for the keyboard, and may offer a more intuitive interface to users unfamiliar with computer operation.

With a touch screen system, the type, size, and number of the virtual buttons may be readily changed by changing the computer's program without changes in the associated hardware. Thus, the touch screen system offers a user-interface that may be flexibly tailored to a particular application. The ability to divide virtual buttons among different screens and to display only those screens needed by the user's particular task can simplify data entry. The combination of text and graphical elements on the screen along with the virtual buttons can help to further guide the user through the steps of data input.

Normally, a touch screen system uses a touch screen panel which is placed directly over the viewing area of a standard computer display, for example, a CRT or a liquid crystal display ("LCD"). The touch screen panel provides a signal to a computer associated with the computer display indicating where on the surface of the display a stylus or finger is placed. This signal may be generated, for example, by acoustic systems detecting absorption of sound by a finger on the surface of the display or by systems using crossed beams of infrared light arrayed along x and y axes which are broken by the finger, or by laminated transparent electrodes which are physically compressed against each other to provide a point electrical contact that may be interpreted as an x and y coordinate.

Frequently a touch screen will be used with a computer contained within a kiosk to be used by the public. The computer may have so-called multi-media capabilities providing both a visual and audio program intended to help members of the public obtain information or directions.

Despite the advantage of touch screen systems in such applications, they present an insurmountable barrier to many people with disabilities. Those with impaired vision perceive only the featureless surface of the display screen knowing that it may contain one or more virtual buttons of arbitrary placement and functions. Those unfamiliar with the language of the legends on the buttons or those who cannot read, are also foreclosed from much of the information presented by touch screen systems. Critical audio information in multi-media presentations will not be received by deaf users. Those with limited mobility may be unable to reach or operate the touch screen surface.

It would be desirable to find a method of making touch screen systems accessible to people with disabilities in a way that preserves to the extent possible the advantageous aspects of a touch screen and multi-media system in simplifying the communication of information to the public.

SUMMARY OF THE INVENTION

The present invention provides a touch screen usable by a larger segment of the population. For those with trouble reading legends on virtual buttons, a separate access button may be used to augment the legends of the virtual buttons, by invoking larger legends, legends in different languages, or spoken legends.

The touch screen may be used by people with disabilities to set the operating mode of the touch screen system according to their needs through a special access touch screen. In this access touch screen, ones of a set of virtual buttons denoting particular problems of communicating with the touch screen are sequentially highlighted and announced through an audio system. The highlighting may proceed according to a clock interval or in response to a sweeping of the user's finger across the buttons which may be arranged in a line. Pressing a special access button at the time of the highlighting modifies the touch screen system to accommodate the particular communication problem.

Accordingly, people with vision or hearing impairment or individual's with limited mobility or limited abilities to interpret displayed text, may all adapt the touch screen system to their particular needs.

Specifically, the invention provides a touch screen for those with reduced written language abilities, the touch screen including an electronic display screen having a display area. An access button is positioned to be actuated by the user while using the touch screen and a touch panel is positioned to be commensurate with the display area to provide a coordinate output indicating a touch point in the display area. An electronic processor communicates with the electronic display screen, the touch panel and the access button and executes a stored program to display on the screen a set of virtual buttons associated with particular program actions. The buttons have boundaries and a legend presenting visual information. If the access button is not actuated at the time a touch point is detected within the boundary of a virtual button, a predetermined program action associated with that button, if any, is executed. If the access button is actuated when a touch point is detected within the boundary of a virtual button, an alternative expression of the legend of that button is provided to the user. That alternative expression may be a written legend printed with larger lettering, an elaboration of a written legend, an audio expression of the legend through audio circuitry generating speech, including for example a description of graphical information, or the legend translated into a different language familiar to the user and presented auditorily or visually.

Thus, it is one object of the invention to augment legends on touch screen buttons in a manner that does not affect the layout and operation of the touch screen for users who are not disabled. The alternative expressions such as larger captions need not be confined to the virtual button's original boundary or orientation.

It is yet another object of the invention to provide assistance to individuals, having difficulty using textual material on the touch screen, in a way that may be used selectively by those individuals. People who are deaf, or have vision impairment but are familiar with the general layout of the touch screen, may thus move through it rapidly without invoking an augmented description of the buttons except when needed. In this regard, the system is ideally used also for individuals having some but limited abilities with the written language with which the buttons are labeled.

The invention may provide an access touch screen for individuals with disabilities, the access touch screen including a set of virtual buttons associated with different problems of communicating with the touch screen. The virtual buttons have written labels denoting these problems. The electronic processor may sequentially highlight these virtual buttons and in coordination with the sequential highlighting of the virtual buttons command the audio circuitry to announce the problem denoted on the label. Synchronously with the sequential highlighting of the virtual buttons, an actuation of the access button may be detected and the operation of the touch screen modified according to the virtual button being highlighted while the access button was pressed.

Thus it is another object of the invention to provide a touch screen interface to allow people of varying disabilities to modify the touch screen operation according to those disabilities. A person with limited physical mobility may await the proper button highlighting indicating limited mobility and other disabilities before pressing the access button which is conveniently located and of large size. Similarly, individuals who are deaf may observe the highlighting and press the access button or may touch the screen to cause the highlighting sequence to jump ahead to the button pressed. Individuals who are blind may use the audio cues and the access button to indicate their selection or may scan their finger across the touch screen causing the highlighting to follow their touch point.

Thus it is another object of the invention to allow multiple disabilities to be accommodated by a touch screen system, and to permit individuals with particular disabilities to move as rapidly as possible through the process of modifying the touch screen for their needs.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 8 is a representation of a table contained in memory defining each virtual button displayed on display screen;

FIG. 9 is a detailed enlargement of the screen of FIG. 2 showing a speed list made visible together with embossments providing ready access to the list members;

DETAILED DESCRIPTION OF THE PREFERRED EMBODIMENT

Figure 1:
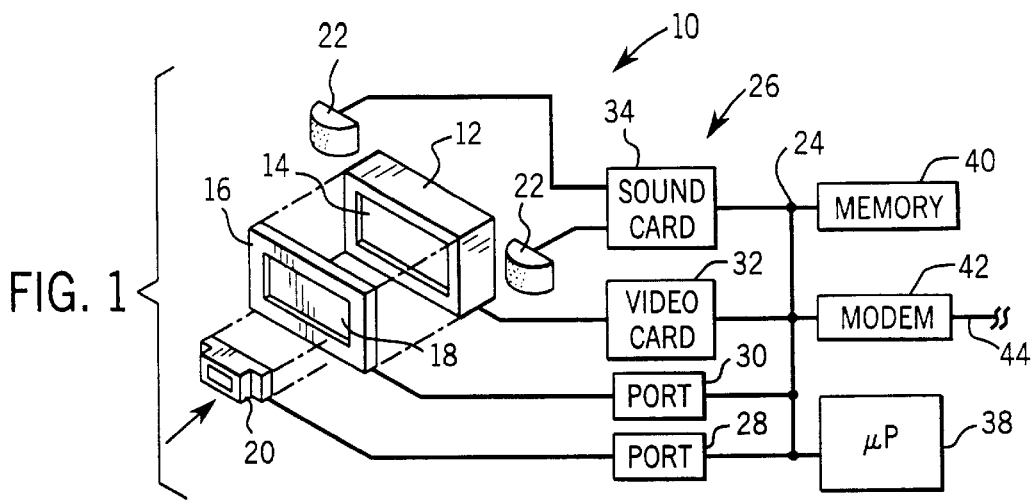
FIG. 1 is a simplified blocked diagram of a typical multimedia touch screen system such as may be used in a kiosk showing the position of the touch panel in front of a display screen with a separate access button positioned at the bottom of the screen.

Referring now to FIG. 1, a touch screen system 10 includes an electronic display 12 having a generally planar and rectangular display area 14 on which text and graphics may be displayed. Such displays 12 are well known in the art and may make use of a cathode ray terminal ("CRT") or a liquid crystal display ("LCD").

Positioned in front of the display area 14 is a touch panel 16 having an active area 18 commensurate in size with the display area 14. The display area 14 may be seen through the active area 18, and a user touching the display area 14 with a finger or stylus (not shown) must pass the finger or stylus first through the active area 18. Touch panels 16 are also well known in the art and may employ a number of different technologies, including those employing crossed beams of infrared light (which detect the finger by the interruption of one or more beams), and those employing layered transparent electrodes (which detect the finger by its deforming the layers and causing the electrodes to touch).

Preferably, in the present invention, the touch panel 16 provides a high resolution X-Y coordinate signal indicating the position of the finger on the display area 14, and "no stylus signal" when the finger is removed. Thus, the location of a touch point of a finger against the display area 14 can be accurately assessed.

An access button 20, being a single-pole single-throw momentary push button switch is mounted near the touch panel 16 in a prominent and uniform location to be accessible to an individual with sight impairment. Access button 20 has a distinctive look and shape and is large to also be easily located by individuals with undetermined disabilities. For blind users, a Braille legend contained within a Braille field 202 (shown in FIG. 10) identifies the button as an access button. Ideally, such a button has a standard shape and color and thus may serve as an identifier for a standard operation of an access screen 200 as will be described. Although the preferred embodiment contemplates a separate physical pushbutton it will be apparent from the following description that the access button 20 may in fact be a readily located portion (or the entire face) of the touch screen or may be other forms of non-mechanical switch, such as a capacitive switch, so long as it is easily located.

Flanking the display 12 are one or more speakers 22 directed toward the user of the touch screen system 10 so that speech and tones generated by the speakers 22 may be heard by the user.

Each of the various components 12, 16, 20 and 22 are connected to an internal computer bus 24 by commercially available adapter cards 26. The access button 20 is connected to the bus 24 by a standard mouse or keyboard port 28 whereas the signal from the touch screen is received by a serial port 30. A video card 32 provides the interface between the bus 24 and the display 12 and a sound card 34 provides an interface between the computer bus 24 and the speakers 22. The sound card 34 may include an on-board amplifier, to provide sufficient volume to the speakers 22, and may include a standard FM synthesizer chip as well as a digital-to-analog converter ("DAC") for synthesizing arbitrary wave forms from a stored sound look up table. This latter feature permits, for example, generating spoken words from text according to readily available speech synthesis software.

Also attached to the computer bus 24 is a microprocessor 38 and associated computer memory 40 for holding a stored program executed by the microprocessor 38 together with variables used in that stored program.

A modem 42 connects the computer bus 24 to a telephone line 44 to provide access to a remote computer, such as a central bank computer, if for example, the touch screen system 10 is used as a remote terminal in an automated teller machine ("ATM") or the like.

Figure 2:
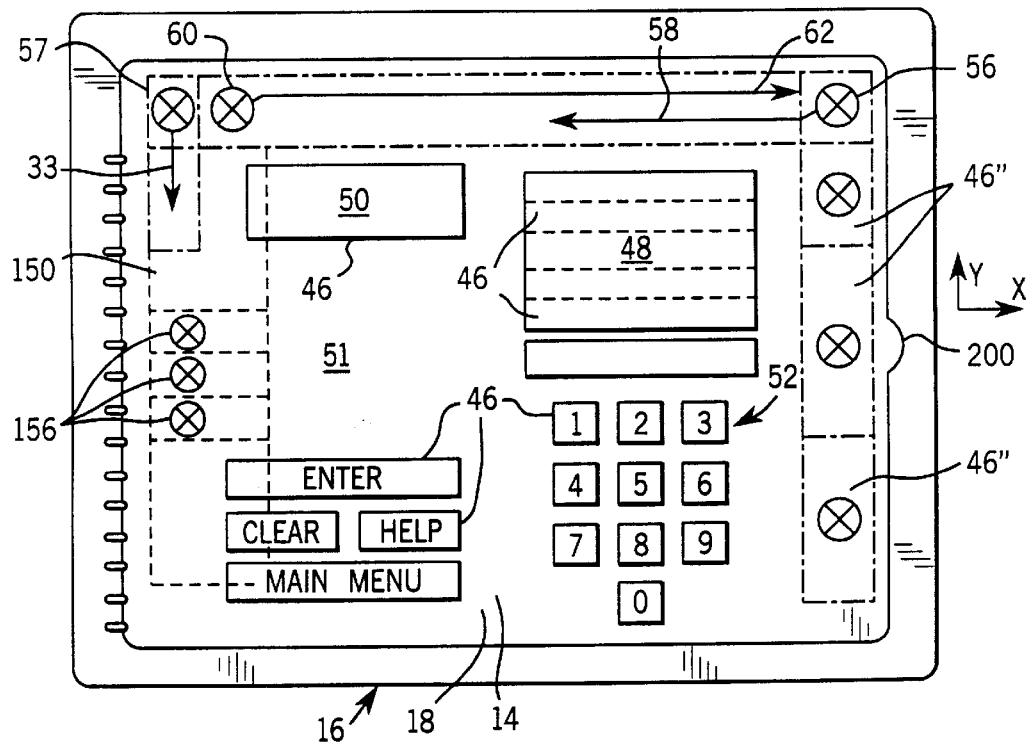
FIG. 2 is a front elevation view of the display screen of FIG. 1 showing an example set of virtual buttons together with particular touch points and trajectories associated with features of the invention.

Referring now to FIGS. 1 and 2, the processor 38 may display on the display area 14 a number of virtual buttons 46 arranged arbitrarily over the surface of the display area and divided into one or more "screens" displayed on at a time on the display area 14. The virtual buttons 46 are grouped one the display area 14, for example, by function, to improve their ease of use. The virtual buttons 46 are also grouped among different screens, for example, to divide the user's interaction the touch screen system 10 into discrete logical stages.

The virtual buttons 46, in their simplest embodiment, are rectangular images containing an alphanumeric label. These images are formed by the video card 32 receiving instructions from the microprocessor 38 which most typically simply relays an image previously stored in memory 40.

Virtual buttons 46 may be "pressed" by a user touching the display area 14 (as is detected by the touch panel 16) causing the microprocessor 38 to execute a predetermined set of instructions associated with that button. For example, referring to FIG. 2, the screen includes a keypad 52 composed of number keys from 0 to 9. As each number key is pressed, the microprocessor 38 may, for example, receive and store that number and/or transmit it via modem 42 to a central computer.

As is understood in the art, each virtual button 46 may include a "pressed", and "unpressed" image reflecting its two possible states. A shadow box around the button 46 changes with these different modes to suggest the shading that would be obtained with a real button being depressed or released.

Other than the differences between the "pressed" and "unpressed" images, the simplest form of virtual buttons 46 are essentially static, staying in the same place and having the same alphanumeric label on a given screen. Generally, however, a given screen may also include nonstatic virtual buttons, for example, a scrolling list 48 of text. The virtual buttons, further, need not look like conventional buttons but may include for example, animated graphical elements that may move across the screen. Scrolling area 48 may be separated into smaller virtual buttons 46 whose location is fixed but whose contents, i.e., the alphanumeric label and the set of instructions executed by the microprocessor 38 change as the display scrolls. In addition, the screen may include printed plain text instructions 50, which, during non-audio mode (to be described) and unlike the above virtual buttons 46, generally are not pressed to invoke the execution of a set of predetermined instructions by the microprocessor 38. Henceforth the term virtual button will be considered to generally embrace any defined field on the screen in which a touch may be detected. Action virtual buttons will be those which may be activated by a touch to cause the computer to initiate a predefined set of instructions. Thus the text field 50 and the scrolling area 48 are virtual buttons 46.

In a non-audio mode, the microprocessor 38 displays a given screen with its virtual buttons 46 and monitors the X-Y coordinate generated by the touch panel 16 comparing the coordinate against a map of button locations contained in memory 40 and associated with that particular screen. If a touch point occurs within the outline of a particular virtual button, that button is considered to have been pressed and the microprocessor 38 executes the instructions associated with that button.

In the present invention, an audio mode may be activated in which audio queues are provided to assist the user with vision-impairment. In the preferred embodiment the audio mode is entered by a standard gesture in which a stylus (e.g., a finger or pen) is pressed against the upper right hand corner of the display area 14 at point 56 and drawn leftward at least half way across the top of the display area 14 as indicated by arrow 58. This gesture is selected to be simple and to start at a readily determinable position on the display area 14 and yet to be unlikely to be accidentally invoked. An opposing gesture, in which the finger is pressed against the upper left hand side of the screen 60 and drawn rightward at least three quarters of the way across the top of the screen as indicated by arrow 62 is used to convert back to a non-audio mode. Canceling the audio mode intentionally, thus requires a somewhat greater effort by the user than activating the audio mode so as to prevent accidental cancellation and to allow the user the greatest possible latitude in moving a finger around on the screen.

When the audio mode has been invoked, generally the touch point will be used to trigger audio cues enabling the individual with vision-impairment or the individual who has difficulty reading the information on the touch screen, improved access to the information and capabilities of the touch screen.

In the audio mode of the present invention, the user is provided with audio clues as to the location of the touch point with respect to the defined virtual buttons 46. Referring now to FIG. 8, the microprocessor 38, evaluates the touch point signal from the touch panel 16, against a table 131 stored in memory 40 and indicating the locations (and sizes) of the virtual buttons 46 and providing a spoken message 80 identifying the button's function. The virtual buttons 46 listed in table 131 are arranged by screens, and each screen is associated with a spoken description 134 describing the general layout of the screen. Thus, the table 131 includes a set of entries 130 for each screen display including a text description of the screen 134 such as may be provided to the sound card 34.

After the audio mode has been invoked, the description 134 of the screen currently displayed by the microprocessor 38 on the display 12 may be played by touching the screen in the upper left hand corner and releasing the touch screen without sliding the finger rightward or downward as indicated by arrows 62 and 33.

The verbal screen description for the screen of FIG. 2, for example, might be:

This screen provides for the withdrawal of money from your account or the determination of an account balance. In the lower right hand corner is a telephone type keypad. Above this keypad is a scrolling menu of different account types including: checking and savings accounts. In the lower left hand corner additional buttons allow the numbers on the key pad to be entered or cleared or invoke a help screen or return you to the main menu. Above these buttons are a text description of this screen.

Referring still to FIG. 8, within the entries 130 for each screen are entries 136 defining the various virtual buttons on the screen by their location of their boundaries 138 and providing a text message 80 usable by the sound card 34 if that virtual button is pressed. The location data includes the necessary information defining an inner and outer boundaries of the button (as will be described). The message data 80 is normally the same as that printed in the image of the virtual button 46 but in the case of text block 50 is a short description of the text, for example, "text field" so that the user is not burdened with listening to the entire text message corresponding to the printed text within the text block 50.

Generally in the audio mode, the microprocessor 38 will identify the screen being displayed and based on a comparison of the touch point to the locations 138 for that screen will play the message 80 associated with that button. As mentioned, when the touch point 57 in the upper left hand corner of the display area 14 is pressed the description 134 associated with that screen will be played.

Consider now the virtual buttons 46 providing number keys 1 and 2 for the keypad 52. The touch point may move in a trajectory 66 from a position to the left of number key 1 in an area not occupied by any other virtual button 46 then across the left most boundary of the generally number key 1 and across the surface of the number key 1 and out of its right boundary into a space not occupied by any other button 46. Continuing the trajectory 66 may cross the left boundary of the number key 2 and prior to exiting the number key 2, the finger may be lifted as indicated by the trajectory 66 becoming dotted.

Each point of the trajectory 66 is associated with an audio queue indicated by audio track 72. Generally for points of the trajectory 66 in area 51 outside of any virtual button 46, a background sound 74 is generated. Such a background tone may, for example, be white noise which is perceived as a gentle hissing sound. The purpose of the background sound 74 is to establish that a touch signal on the screen is in fact being generated but not within any virtual button. This is particularly important in some touch screens which require moderate pressure to be activated. The background sound 74 further establishes that the audio mode has been invoked and that the basic hardware is working.

When the trajectory 66 crosses the left most boundary of the number key 1, an audio ridge signal 76 is generated. Any easily recognized tone may be used, however, in the preferred embodiment it is a short duration signal in keeping with its purpose for providing immediate and accurate indication of the crossing of a button boundary.

Conversely when the trajectory passes out of one button, a second audio ridge signal 78 may be generated, preferably having different characteristics than the audio ridge signal 76 so as to allow the user to discern the entry from the exits of a button. For example, audio ridge signal 76 may be a slightly higher pitched tone suggesting a rising or a lifting as might occur if a real button were crossed and audio tone 78 may be a lower pitched tone suggesting a dropping as if the finger or stylus were passing off of an elevated button. The audio ridge tones 76 and 78 may be further varied to indicate the type of virtual button (e.g., to distinguish between keypad buttons and the text field 50).

A spoken message 80, in this case "one", is begun once the trajectory 66 is within the number key 1. Also, in this case, where the trajectory passes out of number key 1 into a background area 51 and then immediately into the number key 2, the message 80 is truncated upon the occurrence of the audio ridge signal 78. Thus if the user is simply "scanning" the surface of the touch screen or is not interested in the remainder of the description of the button 46, the user may simply move the finger further along causing the message of previous virtual buttons 46 to be silenced.

In contrast, if the finger is lifted prior to the crossing out of a button 46, the message continues to play. For example, as a trajectory 66 crosses the left most boundary of the number key 2, the audio ridge signal 76' is invoked and a spoken message 80' is provided. When the finger is lifted, for example, at instant 82, the message 80' continues to play to completion. This prevents the user from being confused as to which virtual button 46 was the last button pressed if the user's finger briefly touches another button as it is removed from the screen. In particular, when a finger is used as the stylus, a second button may be inadvertently pressed as the user's finger rolls upward from the touch screen. It has been determined that if the message is truncated on this second button, the user may be confused as to the identity of the last button pressed. In a system where the last button pressed is confirmed by pressing the access button 20, any confusion in the identity of the last button pressed may cause the wrong program to be initiated.

Figure 3:
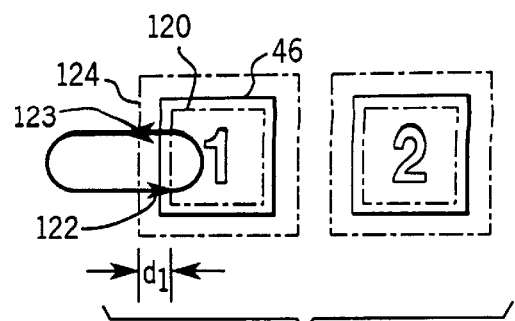
FIG. 3 is an enlarged detail from FIG. 2 showing a touch path across a particular virtual button and the expansion and contraction of the button boundary depending on the direction of the trajectory of the touch point.
Figure 6:
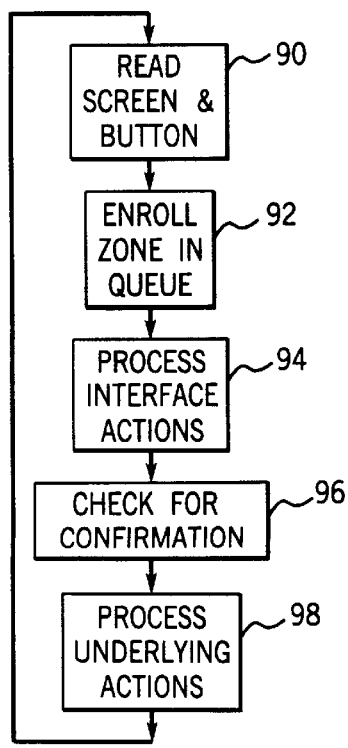
FIG. 6 is a simplified flow chart showing the parsing of touch trajectories into zone changes which affect process actions.

Referring now to FIGS. 1, 3 and 6, the steps taken by the microprocessor 38 in evaluating actions on the touch screen system 10 during the audio mode are broken into three phases. In the first phase, indicated by process block 90, coordinates from the touch panel 16 are received and compared to the locations 138 in table 131 to determine the current state of the touch point as either: in a particular button 46 ("BUTTON") in the background area 51 ("BLANK") or off the screen ("NO TOUCH") indicating that the finger is not touching the touch panel 16.

Next, at process block 92, the particular zone of the touch point is enrolled in a queue so that the immediate history of touch points over time may be determined. For example, if the current state of the touch point is NO TOUCH, the previous state may have been either BUTTON or BLANK with different responses by the microprocessor 38 attaching to each.

Next at process block 94, the microprocessor 38 processes particular interface based on a review of the queue 92. These actions include adjustment of the display 12 and the generation of the audio cues as has been described but not the execution of the underlying actions the buttons normally invoke when pressed in both the audio and non-audio modes.

The text block 50 operate similarly to any other button 46 in their interface actions. When the touch point is within the text zone, a short description of the text message is read. The entire text message is read only when the button selection is confirmed, for example by pressing the access button 20. In the scrolling areas 48 the different zones represent buttons 46 which can announce their contents, however the contents of these buttons 46 generally change as a function of the scrolling. Thus the area in the table 131 normally reserved for the message instead includes a pointer, as is understood in the art, to a separate table (not shown) of scrolled items.

Generally, in the audio mode, the pressing of a button does not immediately invoke the underlying action that pressing the button invoked in the non-audio mode invokes. Instead, that process is broken into two portions, the portion which affects only the display area 14 and the audio cues is separated from the underlying action of the button, for example, the entering of data designated by that button. This two step process is mediated by the access button 20 which must be pressed to confirm a particular action. Thus, the user's finger or stylus is free to wander about the display area 14 to identify the location and functions of the various buttons without fear of activating those buttons. When the access button is pressed, the message 80 of the selection is repeated as a further confirmation.

At process block 96 the activation of the access button 20 is checked. In a preferred embodiment of the invention, activation of the buttons is accomplished by entering within the boundary of a particular button, as has been described, and pressing the access button 20 prior to leaving that boundary. Generally, the user may first touch a particular button 46 and then lift his or her stylus or finger to press access button 20, or in two-handed operation the user may hold his or her stylus or finger within the button 46 pressing access button 20 with the second hand.

At process block 98, if the access button 20 has been pressed, the microprocessor 38 processes the underlying action to that button as if the button had been pressed in the non-audio mode. For text block 50, when the access button is pressed, the full text message of the text block is read.

Figure 5:
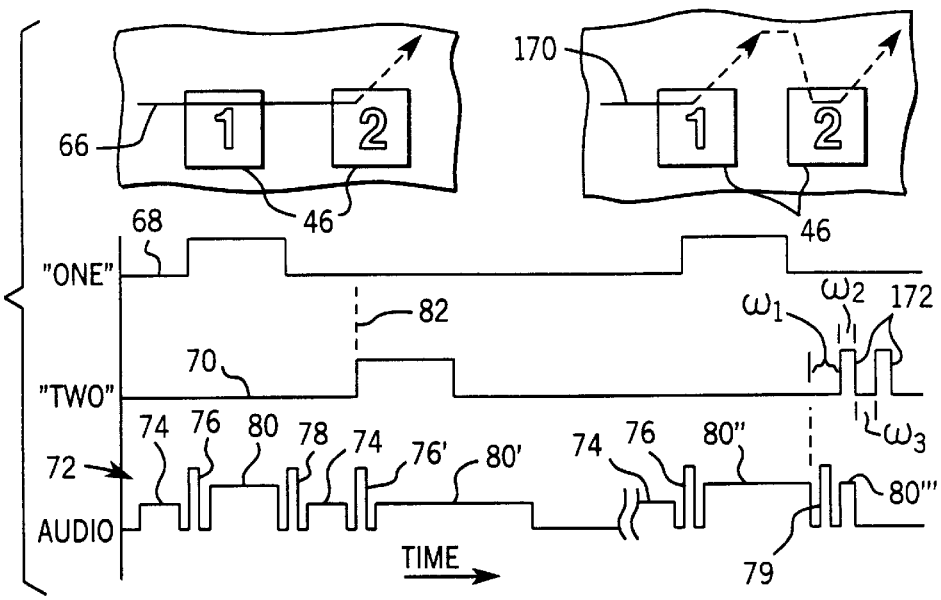
FIG. 5 is a timing diagram showing the generation of audio ridge signals, background sound, and spoken messages as a touch point moves across virtual buttons.
Figure 7:
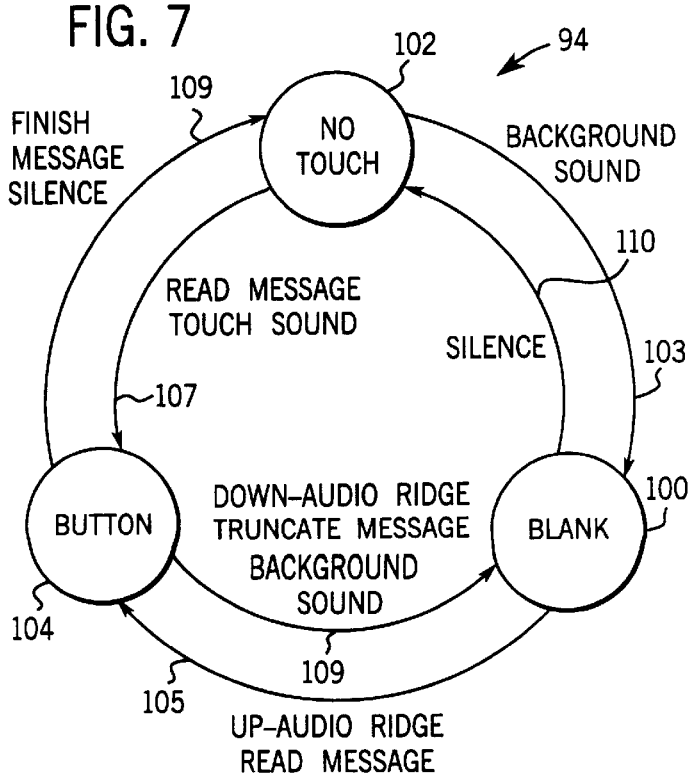
FIG. 7 is a state diagram showing the process actions invoked by various changes in zones of FIG. 6.

Referring now to FIGS. 5 and 7, process block 94 determines the necessary audio actions according to the transition between three states of: NO TOUCH, BLANK, and BUTTON as has been described and as may be determined by the queue established in process block 92 and stored in memory 40. Thus, if the touch point is currently at the BLANK state 100, as determined by process block 90, but was previously in the NO TOUCH state 102, as determined from the queue of process block 92 (a transition indicated by arrow 110), then a background sound 74 is generated to indicate that the touch point is in the background area 51. Similarly, per arrow 109, if the touch point is currently in the BLANK state but was previously in the BUTTON state 104, background sound 74 is generated but also a down direction audio ridge signal 78 is produced and any message in process is truncated. If the access button 20 is pressed, upon reaching the BLANK state the last button entered in the preceding BUTTON state is selected.

If the current state as determined at process block 90 is the BUTTON state 104 indicating that a touch point is within the boundary of a button 46 and if previously the touch point was in the BLANK state 100 (per arrow 105) then an up audio ridge signal 76 is generated and message 80 corresponding to the label of the button 46 is read. In contrast if the BUTTON state 104 is arrived at from the NO TOUCH state 102 (as indicated by arrow 107) the message 80 is read and a touch sound 79 is provided (indicating that the touch panel 16 has registered the touch and shown in FIG. 5), however, no up audio ridge 76 is generated.

Finally if the NO TOUCH state 102 is the current state but the previous state was the BUTTON state 104 (per arrow 119) any message 80 is finished and no sound is generated by the sound card 34. If however the NO TOUCH state 102 is reached by a previous BLANK state 100, then only no sound is generated as indicated by arrow 110.

Referring now to FIGS. 2 and 3, as has been described, the ability to accurately delineate the edges of the virtual buttons 46 so as to permit the user to obtain a sense of their spatial layout is provided by the audio ridge signal 76, 78 at the boundary of the button 46 separate from the message 80 provided by the button. Although it is desirable that the audio ridge 76 or 78 for the edge of the button be sensitive to small changes in the position of touch point so that there is sense of sharp line where the button begins, nevertheless it is also important to prevent confusing multiple triggerings or chatter of the audio ridges 76 and 78 or message 80 at the boundary of the button. Such multiple triggerings may be caused by a touch point that straddles the boundary of the button and hence moves in and out of the boundary to create rapid minor crossing of the boundary. These multiple triggerings (which can also initiate the spoken message 80) clutter the audio channel that is relied on to inform the user with vision-impairment.

Accordingly, in the present invention, two boundaries are used to define each button 46. The first inner boundary 120, generally but not necessarily coextensive with the visual boundary of the button 46, may only be triggered by a passage from outside the boundary 120 to inside the boundary 120 as indicated by arrow 122. Crossing boundary 122 invokes the up audio ridge signal 76 referred to in discussion of FIG. 5.

Once boundary 120 has been crossed, the touch point is considered to be within the button 46 and additional crossings of boundary 120 are of no effect until a second larger boundary 124 outside of boundary 126 is crossed going from the inside of boundary 124 to the outside of boundary 124 as indicated by arrow 123. The distance $d_1$ between boundaries 120 and 124 is selected to be sufficiently large that minor jitter in the movement of the touch point will not cause repeated triggerings of the buttons 46.

When boundary 124 has been crossed from within the boundary to outside of the boundary, an audio down signal 78 is generated and boundary 124 may no longer be triggered by crossing until boundary 120 is again crossed from outside of boundary 120 to inside of boundary 120. Thus, in effect, the boundary of the button moves between boundary 120 and 124 expanding from boundary 120 to 124 when the button is first entered and collapsing to boundary 120 when the button is first exited.

Figure 4:
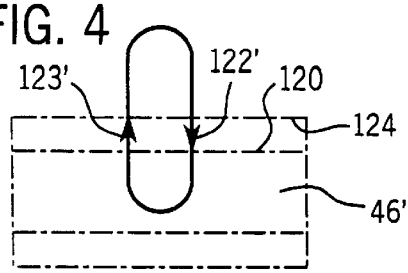
FIG. 4 is a figure similar to that of FIG. 3 showing two button boundaries different only in vertical dimension for a non-displayed speed list button.

Referring now to FIGS. 2, 4 and 9, although the two dimensional layout of some virtual buttons 46, such as the keypad 52, will be convenient to many users with impaired vision, often the two dimensional layout of the virtual buttons 46 will prove unnecessarily cumbersome to users with impaired vision. In these cases, users with impaired vision will prefer simpler arrangement of the buttons yet as still grouped by different screens. The present invention therefore also provides a speed list that may be invoked by the user touching the upper left hand corner of the screen at point 57 (FIG. 2) and drawing his or her finger downward as indicated by arrow 33. As shown in FIG. 9, the speed list, when displayed, provides duplicates of each virtual button 46, with the duplicate buttons 46' arranged vertically along an edge of a frame 152 surrounding the display area 14. The speed list 150 thus contains a complete set of possible virtual buttons 46 found on the particular screen but arranged to be accessed by moving a finger or stylus upward or downward along a single vertical axes of the left side of the frame 152, the frame 152 which forms a natural channel to guide the finger or stylus. It will be understood that other locations of the speed list 150 are also possible as long as they are easily located.

As each virtual button 46' is invoked, the message 80 associated with the button 46 is played according to the rules previously described. That is, each virtual button 46' has an inner boundary 120' and an outer boundary 124' (which differ only in their vertical dimension) and audio ridge signals 76 and 78 are generated when inner boundary 120' is crossed vertically going into the boundary 120' as indicated by arrow 122' or when outer boundary 124' is crossed vertically going out of the boundary as indicated by arrow 123'. Small embossments 154 in the left side of the frame 152 adjacent to the display area 14 may be used to locate the virtual buttons 46' to allow rapid scanning upward and downward within the buttons without waiting for the audio queues of the audio ridges 76, 78 or the associated messages 80. In all other respects the virtual buttons 46' duplicate the virtual buttons 46 used when the touch screen system 10 is in the non-audio mode.

As shown in FIG. 2 generally the speed list 150 need not be displayed but consists merely of a plurality of touch points 156 in a linear arrangement.

The speed list 150 is updated according to the screen display simply by scanning the table 131 to identify the new buttons and messages available on a given screen. When the speed list 150 is invoked, a separate tone in messages 80 may flag those virtual buttons 46 which may change, for example, by scrolling without a screen change. Whenever the speed list appears or disappears its appearance or departure is announced in keeping with a requirement that all changes in existing displays are announced.

Referring again to FIG. 5, in an alternative embodiment in which access button 20 is not used, confirmation of a given virtual button selection may be made by a sharp double tap 172 on the touch panel 16 timed to occur within certain time windows after the touch panel 16 is no longer touched. For example, with a touch trajectory 170 which passes from the background 51 to the surface of the number key 1 and then lifts off the screen to tap twice on the screen (e.g., on the center of the number key 2), a confirmation of the number key 1 may occur. In this case the audio track changes from the background sound 74 and then provides an up audio ridge 76 and a message 80'' prime. Because the touch point is removed from the screen, the message 80'' plays to completion. A short double tap 172 on button 2 and then a release is interpreted as a confirmation. The double tap could occur on any surface of the touch panel 16 but must occur within a predetermined time interval $w_1$ after completion of the message 80, the taps must be no longer than a predetermined $w_2$ and must not be separate by more than $w_3$.

This approach eliminates the need for a separate access button 20 but can require a degree of timing that may make it unsuitable for certain situations or users.

It will be recognized that other methods of confirming a selected virtual key 46 may be used including the use of a landmark position on the touch panel 16 to provide a virtual access button, for example, in the lower left hand corner of the display area 14 or the use of pressure sensitive touch panel 16 where a greater pressure or a pattern of pressure indicating an intentional touch (e.g. a pressure increase followed immediately by a pressure decrease) may be interpreted to be a confirmation of a particular selection.

Referring again to FIG. 2, as has been described, when the text block 50 is pressed it will begin a recitation of the text within that block if the text is short. If the text printed in the block is long the field name is announced (indicating generally the type of field) and the access button 20 must be pressed (or other confirmation signal provided) for the entire text to be spoken. For long messages it may also be desirable to allow the user to pause, jump forward or jump backward in the message by different increments (e.g., sentence, word, letter etc.) as will be described below. These features may be invoked by additional virtual buttons 46'' placed along the right most edge of the display area 14.

In a preferred embodiment, the user moves toward the right side of the screen to locate a reference notch 200 and then touches the screen to invoke a vertical array of buttons 46'' like that of the speed list 150. Moving down from the initial point of contact provides audio descriptions of the buttons 46'' which allow for the selection of a direction of movement within the spoken message (e.g., forward or backward) and for the increment of movement (e.g., paragraph, sentence, word, and letter). The access button is used to select the direction and increment last touched. With each tap of the screen the message is incremented as selected. If the letter increment is chosen the message is spelled, a capability provided by storing the spoken message and its spelling or by using a text driven speech synthesizer. This same procedure may be used to navigate around in a table contained on the screen. In this case the buttons 46'' provide for movement up down left and right.

Access Screen For People With Disabilities

Figure 10:
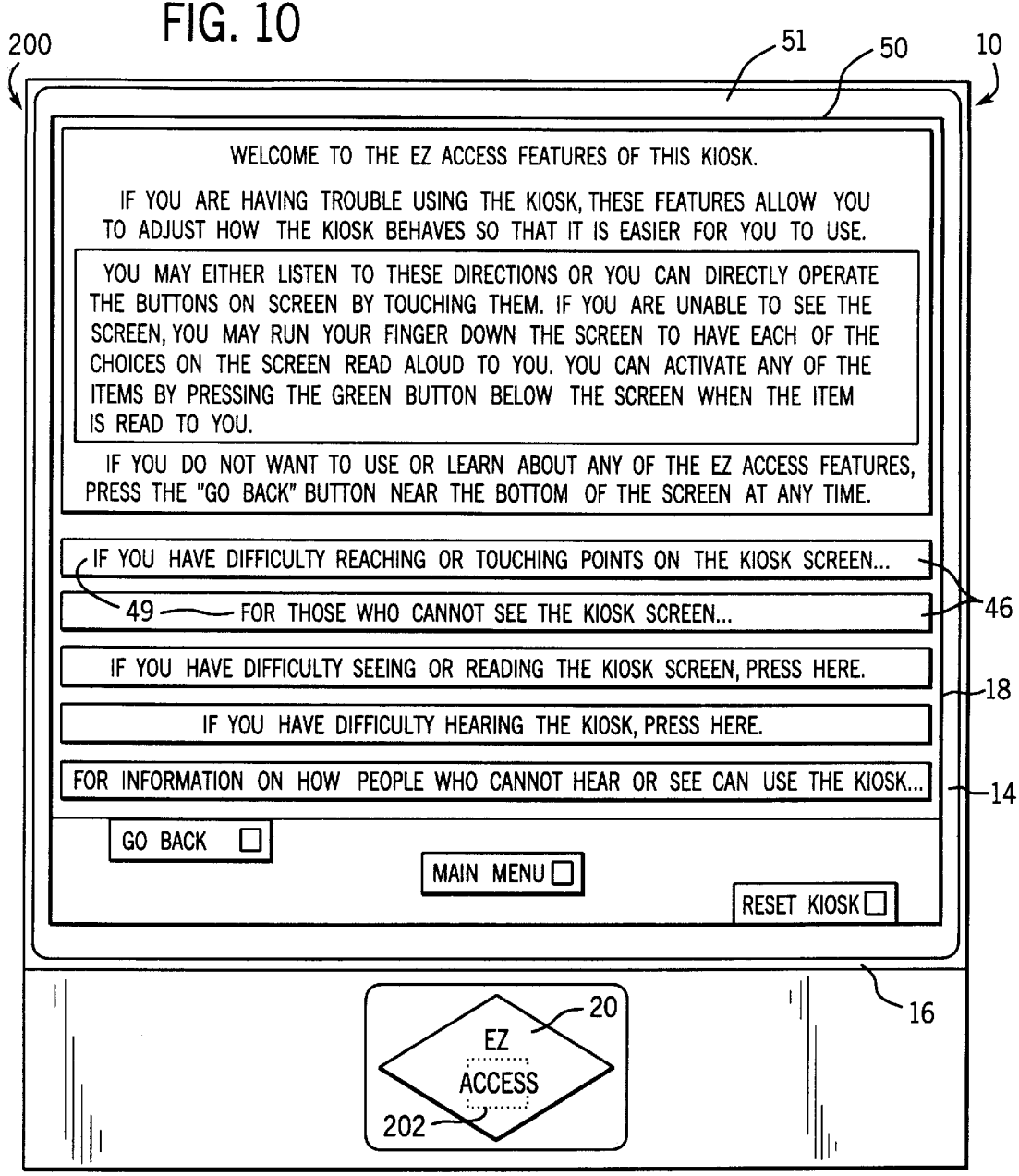
FIG. 10 is a figure similar to that of FIG. 2 showing an access screen for people with disabilities and the positioning of the access button beneath the screen, the screen displaying a set of screen-wide virtual buttons identifying problems of communication for users with disabilities.

The dual requirements of maintaining the advantageous characteristics of the touch screen system 10 in presenting data quickly to users who are not disabled, but to also provide access to the same information by users with disabilities with a minimum of additional effort, are met through the use of an access screen 200 as shown in FIG. 10.

The access screen 200 is displayed by the microprocessor 38 in response to its internal stored program and/or inputs from the user as will be described and is designed to provide multiple paths and methods of communication to users with disabilities so that the touch screen system 10 itself can be used by individuals with disabilities to customize the prospective operation of the touch screen system 10. The ability of the user to customize the touch screen system 10 through the access screen 200 allows the users to select the simplest and most direct touch screen interface that meets their needs.

The access screen addresses the following disabilities: (1) blind individuals, (2) individuals who have difficulty seeing or reading the kiosk, either because the image is not clear or because they cannot interpret the written legends on the screen (this may be a result of problems understanding written language or an unfamiliarity with the particular written language or graphic element on the kiosk), (3) individuals who have difficulty hearing, and (4) individuals who have difficulty reaching or touching the kiosk screen, for example, individuals with restricted mobility including those using wheelchairs. The access screen further contemplates use by individuals with combinations of disabilities including those who cannot hear or see the kiosk.

The access screen, to serve as a way for the user to indicate his or her preferences must be accessible to individuals with an arbitrary one or combination of these disabilities in order to effectively serve its purpose. For this reason, the selection of information and the inputting of preferences to the access screen is allowed in a number of different ways.

In one embodiment, the access button 20 is first pressed to invoke the access screen 200. Alternatively, the access screen 200 may be a default screen that occurs whenever access by a previous user is terminated, for example, through lack of use for a fixed period of time.

Referring still to FIG. 10, the active area 18 of the touch panel 16 includes a single text block 50 at the top of the active area 18 extending from the left to right side of the screen. Below the text block are positioned a set of five horizontal bars forming virtual buttons 46 having sensitive areas extending the full width of the screen. The shape of these virtual buttons 46 is intended to permit these buttons to be activated by a sweeping of a finger from top to bottom of the screen without regard to its horizontal positioning. Each button displays an internal legend 49 which may be written text or a picture intended to communicate information about the buttons function.

Quick Read Feature

Figure 12:
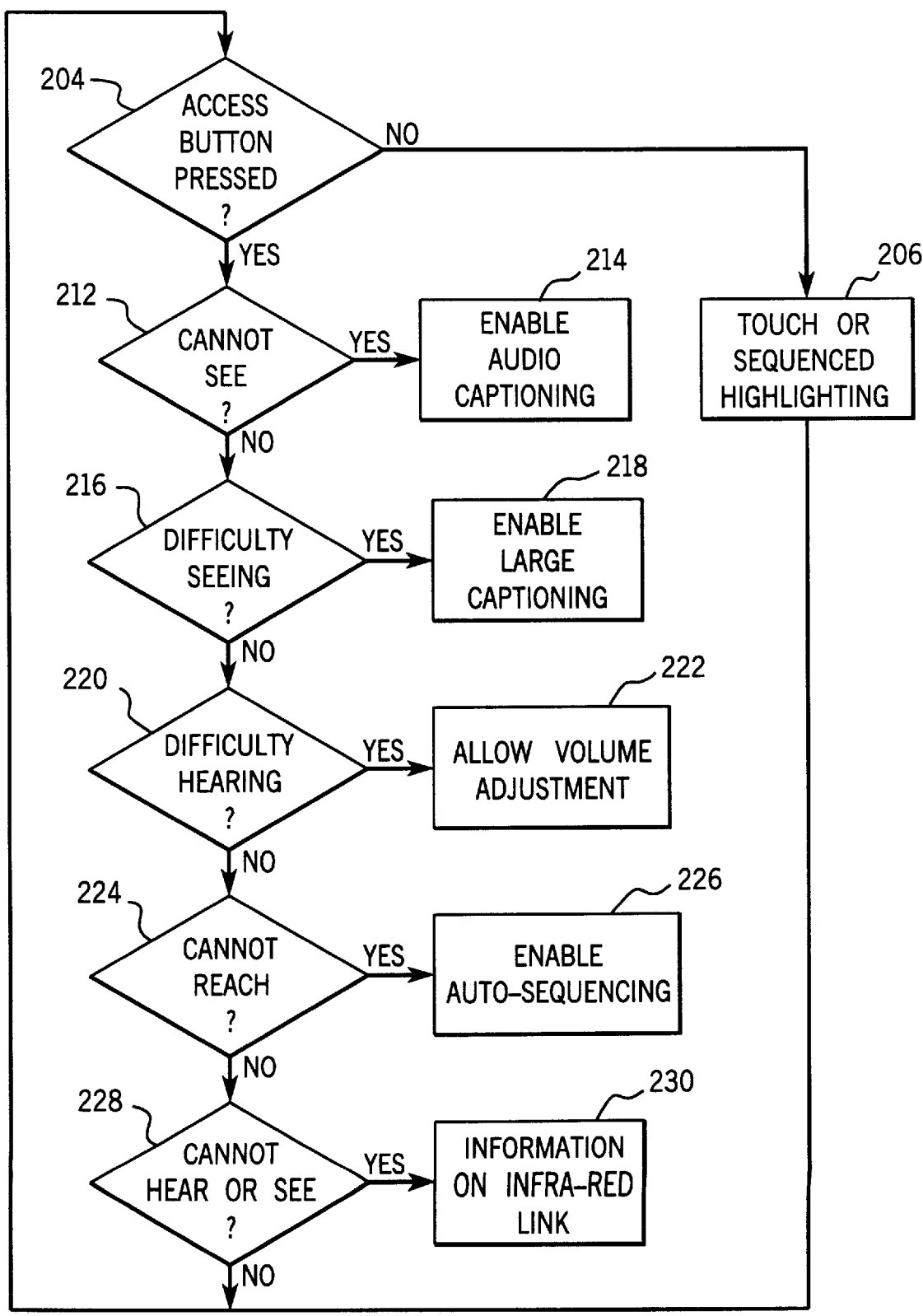
FIG. 12 is a flow chart depicting the operation of the computer in FIG. 1 with respect to the access screen of FIG. 10.

Referring to FIG. 12, after the initiation of the access screen 200, at decision block 204, the microprocessor checks to see if the access button has been pressed again after the access screen 200 has been displayed. Initially, the access button 20 will not have been pressed again because the access screen 200 has just been displayed and the user must react to the information of that screen. In this case, the program moves to process block 206 and the fields on the access screen (text block 50 and virtual buttons 46) are highlighted in series for a period of time determined by an internal timer implemented in software. The time is set to be sufficient for completion of a spoken version of the button's legend 49 as will be described.

This timed highlighting of the buttons can at any time be overridden by an actual touching of the buttons 46 or 50 and thus individuals who are capable of using the buttons 46 or 50 either because their disability does not affect use of the buttons 46 or they are familiar with the placement of the buttons 46 and can immediately select those buttons 46 or 50 relevant to them.

The highlighting of the fields involves the simultaneous communication of the information of the button in several ways. First, the legend 49 of the button 46 including additional text not necessarily displayed on the button 46 is spoken through the sound card 34. In addition and referring to FIG. 11, a caption 210 may be positioned near button 46 (preferably above it so as not to interfere with the natural progression of the user's reading of the button legends. The overlapping of the caption 210 and button 46 provide linkage between the caption 210 and the button 46, but because the caption 210 is not touch sensitive, its boundary is arbitrary. Thus, the caption 210 may include larger and additional text from that of the legend 49 and is not constrained by the boundary of the button 46 which as described, defines the region of sensitivity of the button 46 to a touch.

In cases where caption 210 contains the legend of the button 46 in a different language, this ability to arbitrarily size the caption 210 permits the caption 210 to accommodate the different form factors of the text in other languages. For example, the vertical lines of Japanese characters.

The highlighting with the caption 210 may also include a change in the visual appearance of button 46. For example, a field reversal where the lettering becomes light and the background becomes dark.

This sequencing continues until the access button is pressed at decision block 204. This pressing of the access button 20 detected at decision block 204 activates the particular button 46 being highlighted. This is true whether the highlighting is in response to a touching of the button on the screen or a result of the periodic sequencing through the buttons 46 by the computer based on a predetermined time interval that may be selected by the user. Users who may not be able to reach or accurately touch the buttons 46 will wait until it is highlighted by the computer and then will press the access button 20. The blind may also choose to simply wait until the legend of the button 46 that they desire is read during the computer's sequencing to press the button 20. The spoken text for each button 46 concludes with the statement that the access button 20 should be pressed now if that button 46 is to be selected.

Alternatively, blind individuals may speed the highlighting sequence by sweeping their finger up and down across the buttons 46 in much the same manner as that described with respect to the speed list 150 discussed above. By listening to the spoken legends the proper button is located and the access button is pressed.

Individuals who can see and read the legends of the virtual buttons, e.g., deaf individuals, may simply press the desired virtual button at which time the caption 210 will instruct them to press the access button 20.

When the access button 20 is pressed the program proceeds to determine which of the particular buttons 46 was highlighted at that particular time.

The program first checks to see if the button 46 describing an inability to reach or activate the touch buttons 46 is highlighted. This button 46 is placed first so that individuals with a physical impairment will not have to wait long in the highlighting sequence until a button 46 indicating this problem is highlighted. The highlighting of this button 46 is detected at process block 224. Activating this feature by pressing the access button 20 enables an automatic sequencing for subsequent touch screens, indicated by process block 226, in which the buttons on those screens are automatically highlighted in sequence (similar to the access screen) so that a selection may be made by waiting for the desired button to be highlighted and pressing the access button 20. An additional screen (not shown) may also permit the user to change the speed of the sequential highlighting or to change the mode of the sequencing. In one alternative mode, the sequencing is driven by a separate button from the access button 20 (not shown) which is pressed to increment the sequence more rapidly. The separate button may be a surface of the active area 18 of the touch screen.

The program next checks to see if the button 46 describing an inability to see the kiosk screen has been highlighted, as indicated at decision block 212. If this button was highlighted, the audio cues and button pressing logic described above with respect to FIGS. 5–7 may be invoked for future screens as well as the speed list 150. This enabling is indicated by process block 214 and accomplished by flags within the program that activate this feature until the user has concluded with his or her interaction with the touch screen system 10.

If the button 46 is highlighted, detected at decision block 216, indicating a difficulty seeing the kiosk screen (as opposed to an inability to see the kiosk screen) then at process 218, a "quick read" feature to be described below is enabled or the features described above with respect to process block depending on additional user choices provided in a separate screen.

Individuals with difficulty hearing will press the access button 20 when the virtual button 46 highlighted, as detected at process block 220, indicates a difficulty in hearing. Pressing the access button 20 at this time moves the user to a volume control screen allowing adjustment of the volume level produced by the sound card 34 as indicated at process block 222 using conventional touch screen buttons in lieu of conventional volume controls. The user will also have the option of having written captions for any multi-media sounds provided by the system. An inductive loop feature, allowing those with aids for hearing that permit the detection of inductive signals such as are produced by many telephone systems, to receive the audio information inductively can also be enabled in response to this selection.

Individuals who can neither see nor hear may use an infrared link for personal communication. Information on such a hook-up can be obtained by pressing the final button 46 as detected at decision block 228 or continuously via an infrared transmitter (not shown) that remains on during the access screen.

Each of the process blocks 214, 218,222, and 226 also may provide information on the infrared link and on privacy issues related to the features selected by the user, for example the use of a handset (not shown) or headphones connected to a audio jack (not shown), or the turning off of the display screen 12 or the speakers 22.

The operation of the access screen 200 as described above provides a method for individuals with varied disabilities to use the touch screen system 10, but also provides for efficient and rapid selection of those features need by the user as quickly and as simply as possible.

Figure 13:
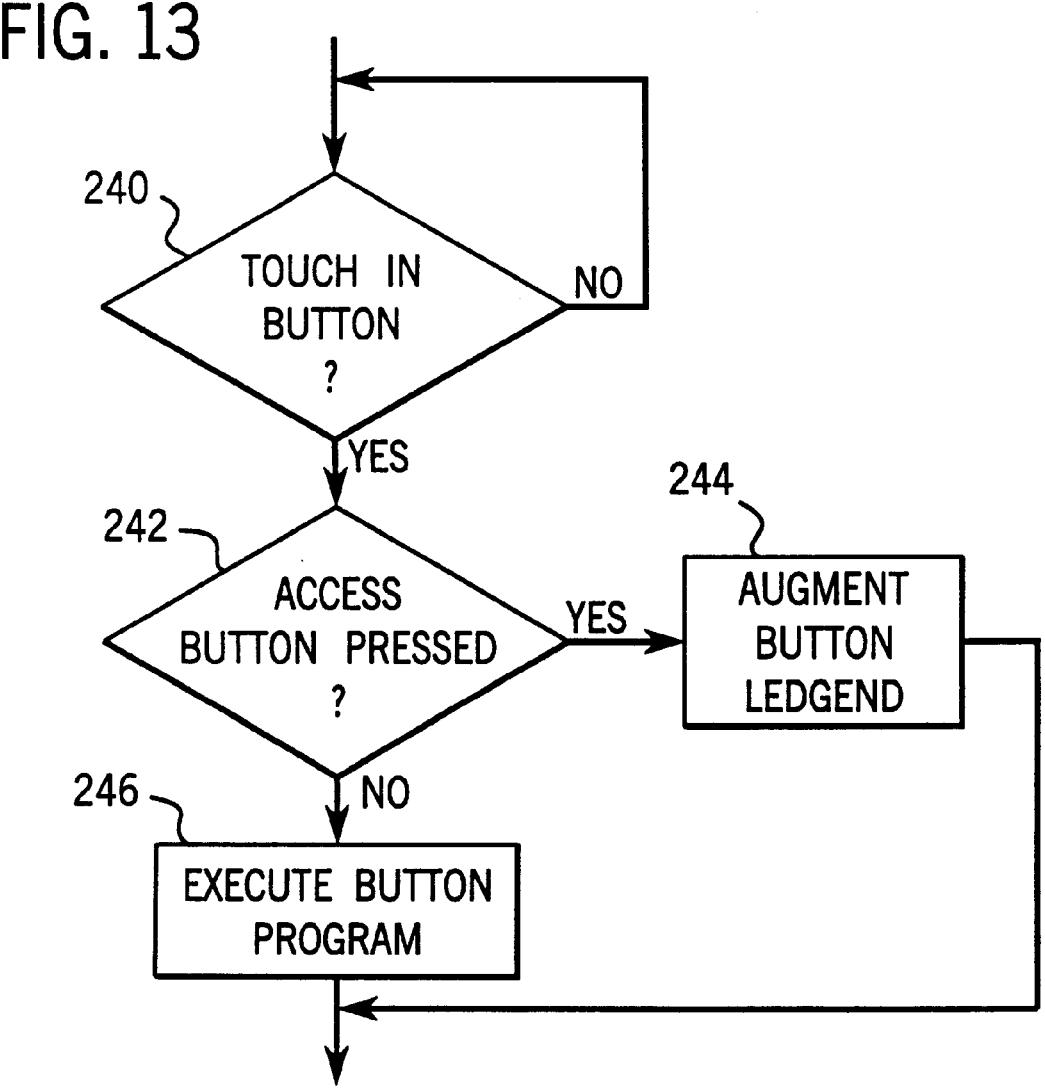
FIG. 13 is a simplified flow chart of the operation of the access button of FIG. 10 in a context other than the access screen of FIG. 10.

Referring now to FIG. 13, for individuals who can see the screen and the layout of the virtual buttons, but who have trouble interpreting or remembering the legends on the buttons for a relatively few number of those buttons, a captioning of each button may be inappropriately burdensome. Accordingly, the access button 20, being otherwise unused for particular disability, may be used in subsequent screens to provide selective captioning.

Figure 11:
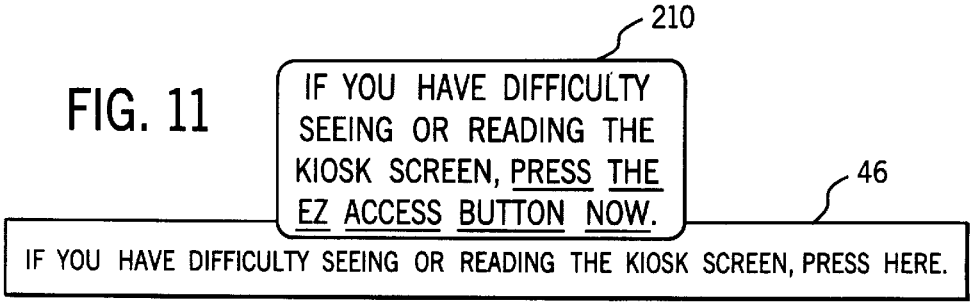
FIG. 11 is a detail of one button of FIG. 10 having a superimposed large type caption.

In this mode of operation, if the access button 20 is being pressed, as determined at decision block 242, when the touch screen system 10 detects a touch point within a virtual button 46, indicated by decision block 240 then the legend of the button is augmented as provided at process block 244. Again, such augmentation may include a caption 210 as shown in FIG. 11 elaborating on the legend or a written in a different language and/or a spoken version of the caption in the same or a different language provided by the sound card 34. In cases where the legend is a graphical element, the augmentation may be a description of the element or the underlying function of the button. If the access button 20 is not pressed at the time of a touch within a virtual button 46, the program proceeds to process block 246 to simply execute the program associated with the button 46 as is normally the case with a kiosk touch screen system 10.

In this way, an individual largely familiar with the operation of the touch screen may employ it in a conventional manner touching those buttons they wish to activate, but by pressing the access button 20 may cause those buttons not to activate, but instead to augment the description of their legends for greater comprehension.

The above description has been that of a preferred embodiment of the present invention. It will occur to those that practice the art that many modifications may be made without departing from the spirit and scope of the invention. Clearly, the present invention is not limited to use with full sized computer terminals but may be used on any touch screen providing the necessary spatial resolution, for example, those used on cellular telephones, personal digital assistants ("PDA's") or various pieces of standard office equipment such as copy or fax machines. The audio circuitry may share components with the computer and may rely on the computer for certain synthesis tasks. In order to apprise the public of the various embodiments that may fall within the scope of the invention, the following claims are made.

I claim:

1. A touch screen for those with reduced ability to interpret visual expressions comprising:
    an electronic display screen having a smooth display area without spatially distinguishing tactile landmarks;
    a touch panel commensurate with the display area and providing a coordinate output indicating only a presence or absence of touch points in the display area;
    an access button positioned at a predetermined fixed location to be actuated by the user to enable an access mode;
    audio circuitry for generating speech in response to electrical commands from an electronic processor;
    an electronic processor communicating with the electronic display screen, the touch panel, and the access button and executing a stored program to:
        (a) display on the electronic display screen a set of virtual buttons, the buttons having graphical boundaries and a graphical legend and locations different from the location of the access button;
        (b) when the access mode is not enabled and when a touch point is detected within a boundary of a virtual button, the electronic processor executing a program action associated with the virtual button; and
        (c) when the access mode is enabled and when a touch point is detected within the boundary of the virtual button, the electronic processor outputting via the audio circuitry a spoken representation of the information of the graphical legend of the virtual button easier for the user to interpret.

2. The touch screen of claim 1 wherein the graphical legend is text and wherein the alternative representation of the graphical legend is the text of the graphical legend translated into a different language.

3. The touch screen of claim 1 wherein the alternative representation is a description of a graphical legend.

4. The touch screen of claim 1 wherein the alternative representation is an elaboration on text of the graphical legend.

5. The touch screen of claim 1 wherein the access button is a physical push-button switch.

6. A touch screen device comprising:
    an electronic display screen having a display area;
    a touch panel commensurate with the display area and providing a coordinate output indicating a touch point in the display area;
    an access button positioned in a predetermined fixed location to be actuated by the user while viewing the touch screen;
    audio circuitry for generating speech in response to electrical commands from an electronic processor
    an electronic processor communicating with the electronic display screen, the touch panel, and the audio circuitry and executing a stored program to:
        (a) display on the screen a set of virtual buttons associated with different problems of communicating with the touch screen, the virtual buttons having written labels denoting those problems;
        (b) sequentially highlighting the virtual buttons under control of the stored program;
        (c) in coordination with the sequential highlighting of the virtual buttons, commanding the audio circuitry to announce the problem denoted on the label;
        (d) synchronously with the sequential highlighting of the virtual buttons, detecting an actuation of the access button; and (e) modifying the operation of the touch screen according to the button being highlighted while the access button was pressed;

wherein step (b) highlights the button by printing a message on the display screen indicating that the access button should be now pressed.

7. The touch screen of claim 6 wherein the virtual buttons are arranged in a line with their sensitive areas extending fully across the screen and wherein the sequencing of step (b) follows a touchpoint of a person drawing a finger in a line across the virtual buttons.

8. The touch screen of claim 6 wherein step (b) sequentially highlights the button according to a predetermined time interval.

* * * * *

UNITED STATES PATENT AND TRADEMARK OFFICE
CERTIFICATE OF CORRECTION

PATENT NO.   : 6,049,328
DATED        : April 11, 2000
INVENTOR(S)  : Gregg C. Vanderheiden It is certified that error appears in the above-identified patent and that said Letters Patent is hereby corrected as shown below:

In the specification, under the heading "Statement Regarding Federally Sponsored Research Or Development, add the following:

--This invention was made with United States government support awarded by the following agencies: DED Grant No(s) HO29A10026-95; H133E30012-95; and H133G20031-94 and USPS Grant No. 102590-96-Z-0812. The United States has certain rights in this invention.--

Signed and Sealed this

Fifth Day of June, 2001

Attest:

*Attesting Officer*

NICHOLAS P. GODICI

*Acting Director of the United States Patent and Trademark Office*